United States Patent
Sawada et al.

(10) Patent No.: US 9,958,936 B2
(45) Date of Patent: May 1, 2018

(54) HEAD MOUNTED DISPLAY DEVICE

(71) Applicant: KABUSHIKI KAISHA TOSHIBA, Minato-ku, Tokyo (JP)

(72) Inventors: Shimpei Sawada, Kanagawa (JP); Kazuo Horiuchi, Kanagawa (JP); Yoshiyuki Kokojima, Kanagawa (JP); Masahiro Baba, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 72 days.

(21) Appl. No.: 14/641,638

(22) Filed: Mar. 9, 2015

(65) Prior Publication Data
US 2015/0331482 A1 Nov. 19, 2015

(30) Foreign Application Priority Data
May 19, 2014 (JP) ................. 2014-103507

(51) Int. Cl.
*G06F 3/01* (2006.01)
*G02B 27/01* (2006.01)
(Continued)

(52) U.S. Cl.
CPC .......... *G06F 3/011* (2013.01); *G02B 27/0025* (2013.01); *G02B 27/0172* (2013.01);
(Continued)

(58) Field of Classification Search
CPC .............. G02B 27/017; G02B 27/0172; G02B 27/0025; G02B 27/2235; G02B 2027/011; G06F 3/011; G06F 3/147; H04N 13/044
See application file for complete search history.

(56) References Cited

U.S. PATENT DOCUMENTS 8,384,999 B1 2/2013 Crosby et al.
2011/0057863 A1 3/2011 Sugihara et al.
(Continued)

FOREIGN PATENT DOCUMENTS

JP 2002-287077 10/2002
JP 2009-115908 5/2009
(Continued)

OTHER PUBLICATIONS

Extended European Search Report for European Patent Application No. 15158778.9 dated Oct. 7, 2015.
(Continued)

*Primary Examiner* — Xuemei Zheng
(74) *Attorney, Agent, or Firm* — Amin, Turocy & Watson LLP (57) ABSTRACT

According to one embodiment, a display device includes a display unit, an optical unit, and a reflector. The display unit includes a plurality of pixels arranged in a first plane. The display unit emits light including image information. At least a portion of the light emitted by the display unit is incident on the optical unit. The optical unit includes a first optical element. A travel direction of the at least the portion of the light is modified by the first optical element. The reflector reflects the at least the portion of the light modified by the first optical element. A perpendicular direction perpendicular to the first plane is non-parallel to an optical axis of the first optical element.

20 Claims, 9 Drawing Sheets

(51) Int. Cl.
*G02B 27/00* (2006.01)
*H04N 13/04* (2006.01)
*G06F 3/147* (2006.01)

(52) U.S. Cl.
CPC .......... *G06F 3/147* (2013.01); *H04N 13/044* (2013.01); *G02B 2027/011* (2013.01); *G02B 2027/0178* (2013.01)

(56) References Cited

U.S. PATENT DOCUMENTS

2013/0077175 A1* 3/2013 Hotta .................. G02B 3/08 359/630
2015/0338656 A1 11/2015 Tsuruyama et al.

FOREIGN PATENT DOCUMENTS

| | | | |
|---|---|---|---|
| JP | 2011-22210 | | 2/2011 |
| JP | 2011022210 A | * | 2/2011 |
| JP | 2011-053522 | | 3/2011 |
| JP | 2011-059444 | | 3/2011 |
| JP | 2011053522 A | * | 3/2011 |
| JP | 2013-073070 | | 4/2013 |
| JP | 5273169 | | 8/2013 |
| JP | 2015-219489 | | 12/2015 |

OTHER PUBLICATIONS

Office Action of Notification of Reason(s) for Refusal for Japanese Patent Application No. 2014-103507 Dated Mar. 30, 2015, 6 pages.
Japanese Office Action for Japanese Application No. 2014-103507 dated Aug. 13, 2015.

* cited by examiner

FIG. 13

HEAD MOUNTED DISPLAY DEVICE

CROSS-REFERENCE TO RELATED APPLICATIONS

This application is based upon and claims the benefit of priority from Japanese Patent Application No. 2014-103507, filed on May 19, 2014; the entire contents of which are incorporated herein by reference.

FIELD

Embodiments described herein relate generally to a display device.

BACKGROUND

For example, there is a display device that includes a display unit that displays an image, a projector that projects the image displayed by the display unit by using multiple optical elements such as lenses and the like, a reflector that reflects the light projected from the projector toward an eye of a viewer, etc. For example, such a display device is used as a head mounted display device such as a head mounted display (HMD), etc. Large aberrations may occur when the light that is emitted from the display unit travels via the multiple optical elements included in the projector, the reflector, etc. A display device that suppresses the aberration and provides an easily-viewable display is desirable.

DETAILED DESCRIPTION

According to one embodiment, a display device includes a display unit, an optical unit, and a reflector. The display unit includes a plurality of pixels arranged in a first plane. The display unit emits light including image information. At least a portion of the light emitted by the display unit is incident on the optical unit. The optical unit includes a first optical element. A travel direction of the at least the portion of the light is modified by the first optical element. The reflector reflects the at least the portion of the light modified by the first optical element. A perpendicular direction perpendicular to the first plane is non-parallel to an optical axis of the first optical element.

Embodiments will now be described with reference to the drawings.

The drawings are schematic or conceptual; and the relationships between the thicknesses and widths of portions, the proportions of sizes between portions, etc., are not necessarily the same as the actual values thereof. Further, the dimensions and/or the proportions may be illustrated differently between the drawings, even in the case where the same portion is illustrated.

In the drawings and the specification of the application, components similar to those described in regard to a drawing thereinabove are marked with like reference numerals, and a detailed description is omitted as appropriate.

First Embodiment

Figure 1:
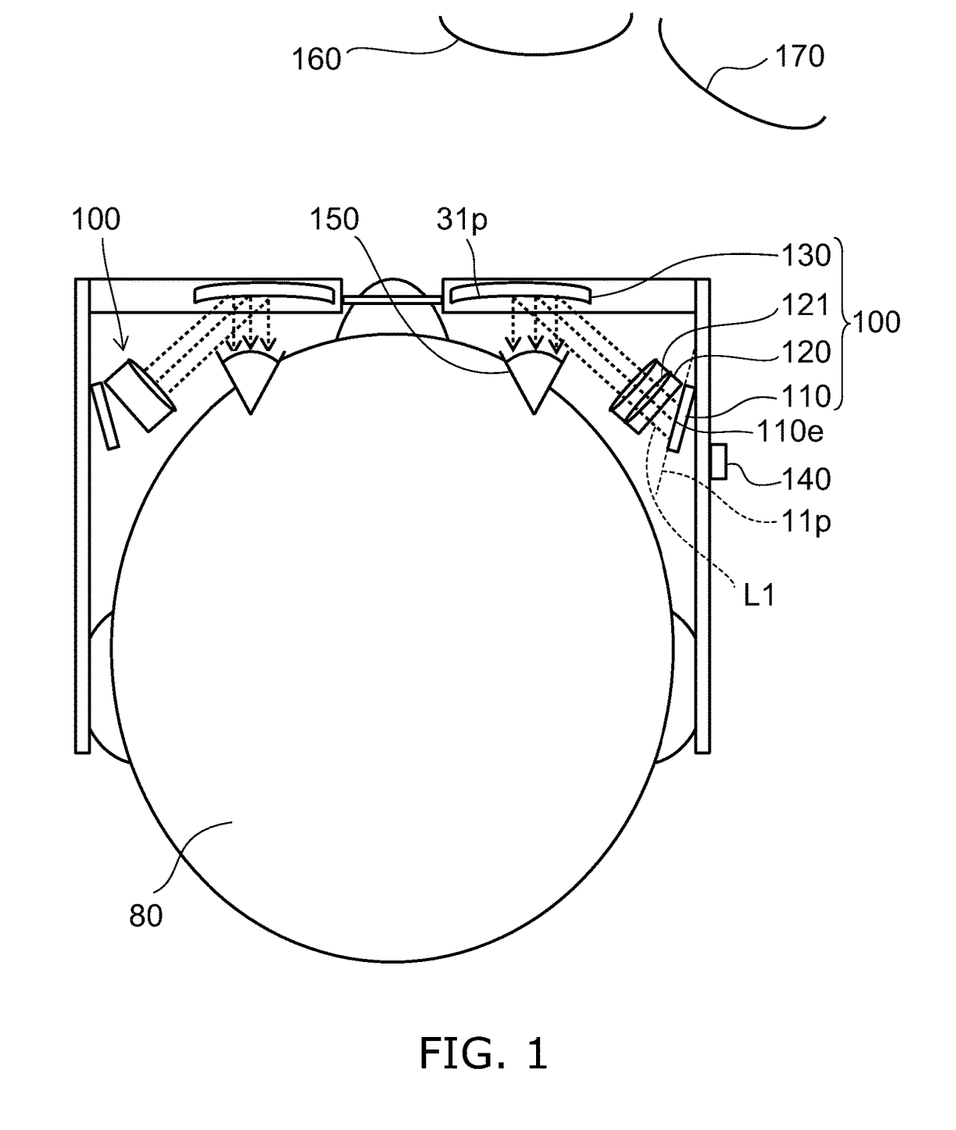
FIG. 1 is a schematic plan view illustrating a display device according to a first embodiment.
Figure 2:
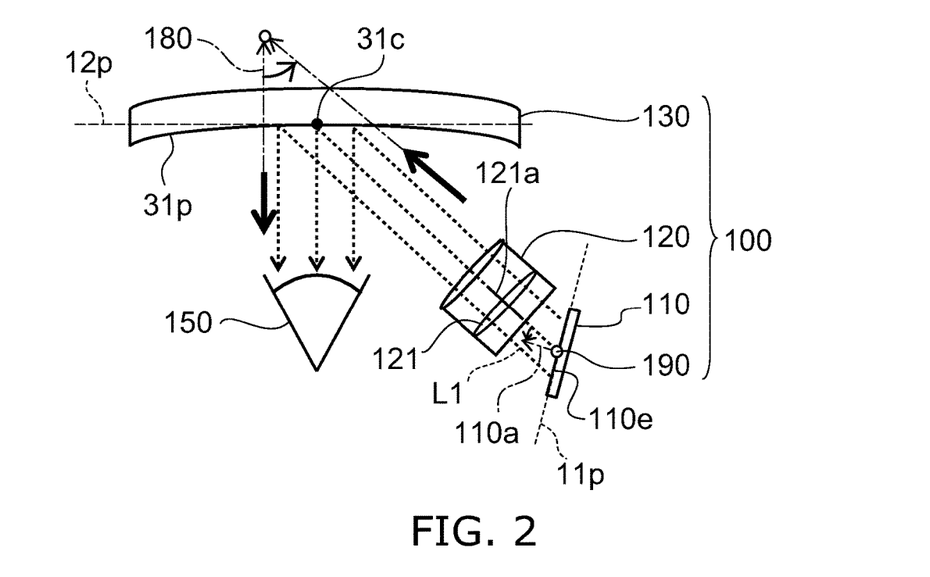
FIG. 2 is a schematic plan view illustrating a display device according to a first embodiment.

FIG. 1 and FIG. 2 are schematic plan views illustrating a display device according to a first embodiment.

As shown in FIG. 1 and FIG. 2, the display device 100 includes a display unit 110, an optical unit 120 (a projector), a reflector 130, and a processing unit 140.

For example, image information is input to the display unit 110 from the processing unit 140.

The display unit 110 includes multiple pixels 110e. The multiple pixels 110e are provided to be arranged in a first plane 11p. The display unit 110 emits light L1 including the image information. The display unit 110 is a display that displays an image. The light that includes the image information is emitted toward the optical unit 120. The display includes, for example, a liquid crystal, organic EL, liquid crystal on silicon, etc. However, the embodiment is not limited thereto.

The optical unit 120 is provided between the display unit 110 and the reflector 130 in the optical path of the light L1 emitted from the multiple pixels 110e of the display unit 110. In other words, the optical unit 120 is disposed so that at least a portion of the light L1 emitted by the display unit 110 is incident. For example, the optical unit 120 includes multiple optical elements and a first optical element 121. For example, the first optical element 121 is the optical element of the multiple optical elements most proximal to the display unit 110. The light L1 that is emitted from the display unit 110 is incident on the first optical element. For example, the first optical element modifies the travel direction of the light L1. The optical elements may include lenses, prisms, mirrors, etc. In the example, the first optical element 121 is a lens. The multiple optical elements may not be arranged in a straight line.

The reflector 130 has a first surface 31p. The reflector 130 is provided at a first surface 31p. The reflector 130 spreads along the first surface 31p and extends in two mutually-different directions. The first surface 31p is a main surface of the reflector 130. The reflector 130 reflects at least a portion of the light L1 emitted by the optical unit 120. For example, the reflector 130 reflects the light passing through the optical unit 120 toward a pupil 150 of a viewer 80. When viewed from the pupil 150, the light that is reflected by the reflector 130 forms an image 160 as a virtual image. Other than a plane, the first surface 31p may be a curved surface or a structure having an unevenness.

In the example, the image is displayed as a virtual image. However, the reflector 130 may display the image as a real image distal to the pupil 150.

In the example, the image 160 is displayed at the front of the pupil 150. However, the image may be displayed like an image 170 at the edge of the visual field of the viewer 80. Thereby, the visual field of the viewer 80 is not obstructed.

In the case where the image is displayed like the image 160 at the front of the pupil 150, the reflector 130 reflects the light incident from obliquely behind the pupil 150 as viewed by the viewer 80 toward the pupil 150 (e.g., in the direction of the normal of the reflector 130). Thereby, the viewer 80 can view the image. For example, multiple fine half mirrors are arranged in parallel on the first surface 31p and are used as the reflector 130. Thereby, for example, the reflection angle of the light can be adjusted. In case that the reflector 130 includes multiple mirrors, the surface of the reflector 130 opposite to the optical unit 120 may be considered as the first surface 31p. However, in the embodiment, the reflector 130 is not limited to such half mirrors. Normal half mirrors may be used as the reflector 130; and other members that can similarly adjust the reflection angle may be used. Although an example is described in which the reflectance and the transmittance of the half mirror are the same, the embodiment is not limited to the example in which the reflectance and the transmittance are the same. Any material may be used as the reflective surface as long as the material transmits a portion of the light and reflects a portion of the light.

A binocular HMD that uses two display devices 100 is shown in FIG. 1. One of the display devices displays an image to the right eye of the viewer 80; and the other display device displays an image to the left eye. The embodiment may be a monocular HMD that displays an image toward one eye using one display device 100.

As shown in FIG. 2, the first optical element 121 has an optical axis 121a. A direction that is parallel to the optical axis 121a intersects a direction that is parallel to a normal 110a of the first plane 11p (a perpendicular direction perpendicular to the first plane 11p) when projected onto a plane. In other words, the normal 110a of the first plane 11p is tilted with respect to the optical axis 121a of the first optical element 121. The display unit 110 and the first optical element 121 are arranged so that the normal 110a of the first plane 11p is non-parallel to the optical axis 121a of the first optical element 121. The first plane 11p is tilted with respect to the optical unit 120. For example, the angle between the optical axis 121a and the normal 110a is not less than 1 degree and not more than 10 degrees.

Thus, the display unit 110 is disposed to be tilted with respect to the optical unit 120. Thereby, the aberration described below of the virtual image that is formed can be suppressed.

Such an arrangement may be considered to be a modification of the case where the display unit is not tilted (the case where the normal of the display unit and the optical axis of the first optical element are parallel) such that the display unit 110 is rotated around a rotational axis 190. The rotation direction 180 of the display unit 110 is determined by the incident direction and reflection direction of the light at the reflector 130.

A second plane 12p that is tangent to the first surface 31p and passes through an intersection 31c of the optical axis 121a and the first surface 31p is considered. For example, in the case where the first surface 31p is a plane, the first surface 31p and the second plane 12p are parallel. In the example, the rotational axis 190 is substantially parallel to the second plane 12p (and the first surface 31p).

Figure 8:
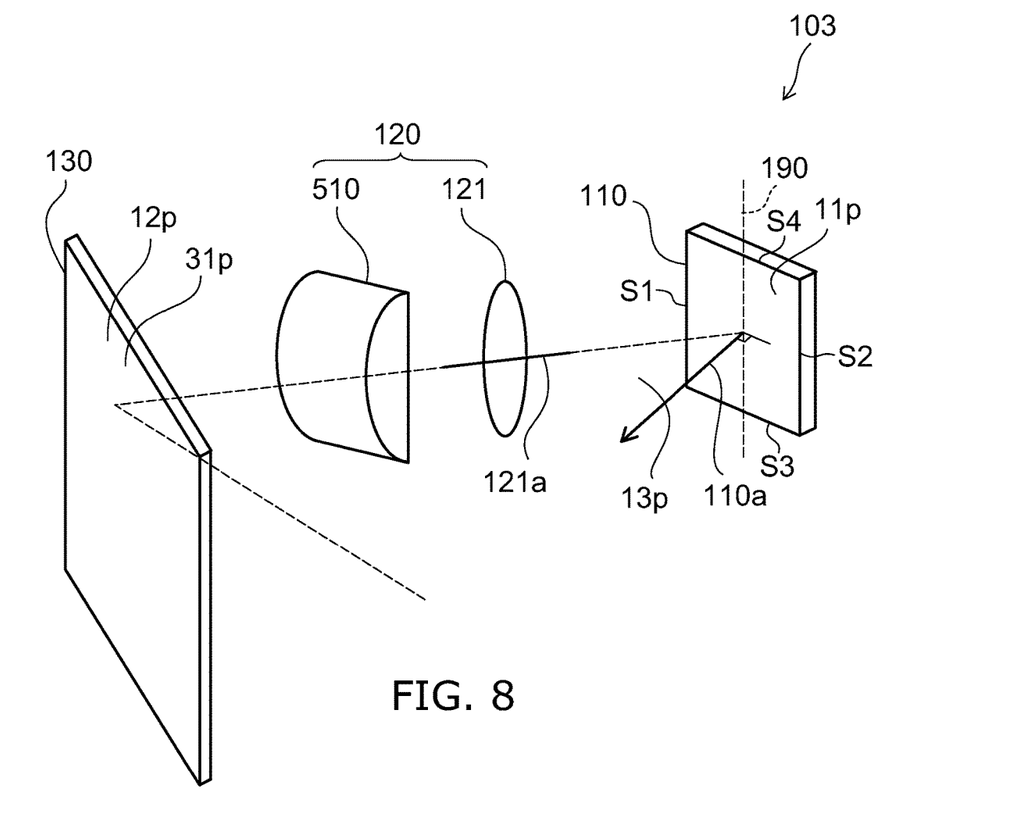
FIG. 8 is a schematic perspective view illustrating another display device according to the second embodiment.

For example, a third plane 13p includes the optical axis 121a and the normal 110a (referring to FIG. 8). The third plane 13p includes the intersection between the optical axis 121a and the first plane 11p.

In the example, the rotational axis 190 is perpendicular to the third plane 13p. The second plane 12p (and the first surface 31p) are substantially parallel to a direction perpendicular to the third plane 13p.

Figure 3:
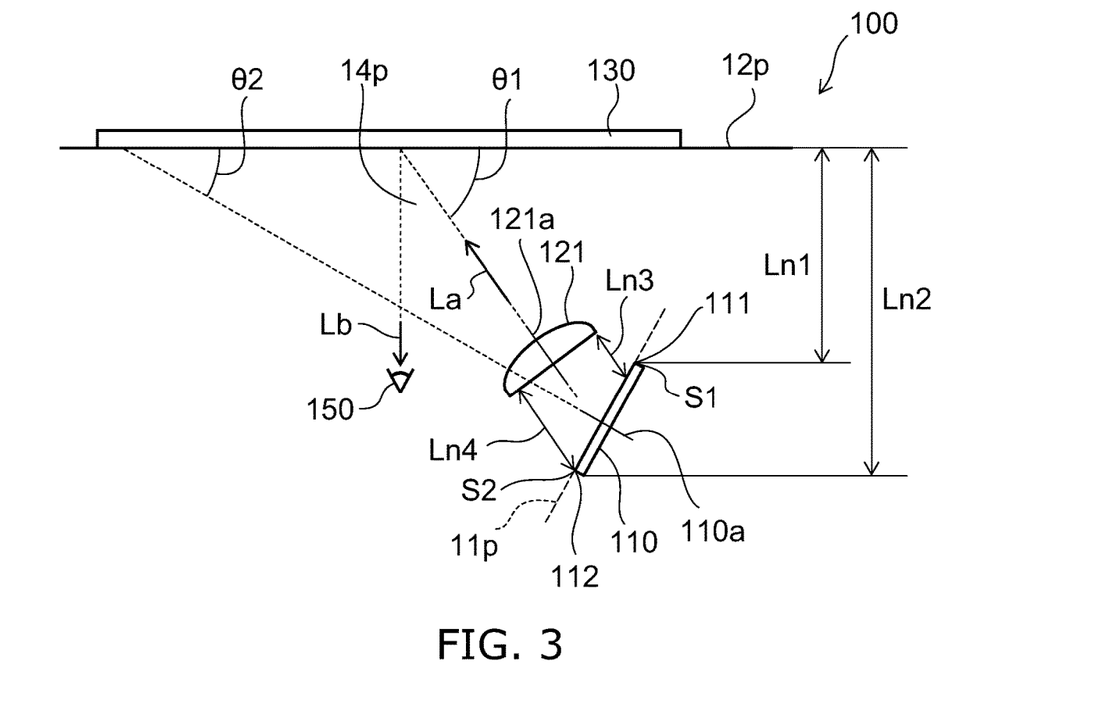
FIG. 3 is a schematic plan view illustrating the display device according to the first embodiment.

FIG. 3 is a schematic plan view illustrating the display device according to the first embodiment.

FIG. 3 shows only a portion of the display device 100 and shows the disposition (the rotation direction) of the display unit 110. As shown in FIG. 3, a first angle $\theta 1$ is the angle between the second plane 12p and a direction parallel to the optical axis 121a. A second angle $\theta 2$ is the angle between the second plane 12p and a direction parallel to the normal 110a. The first angle $\theta 1$ is larger than the second angle $\theta 2$.

The display unit 110 has a first end portion 111 and a second end portion 112 on the first plane 11p. The second end portion 112 is separated from the first end portion 111 in one direction in the first plane 11p in which the multiple pixels are provided. In the example, the first end portion 111 and the second end portion 112 are two points on a plane 14p including a chief ray La of the light emitted by the optical unit 120 and a chief ray Lb of the light reflected by the reflector 130 to be incident on the viewpoint. The viewpoint is, for example, the position of the pupil 150.

The display unit 110 has two sides (a side S1 and a side S2) opposing each other on the first plane 11p (e.g., referring to FIG. 8). The first end portion 111 is a point on the side S1; and the second end portion 112 is a point on the side S2.

The distance between the first end portion 111 and the reflector 130 is shorter than the distance between the second end portion 112 and the reflector 130.

In the example, a distance Ln1 between the second plane 12p and the first end portion 111 is shorter than a distance Ln2 between the second plane 12p and the second end portion 112.

A distance Ln3 between the first end portion 111 and the first optical element 121 is shorter than a distance Ln4 between the second end portion 112 and the first optical element 121.

Figure 4:
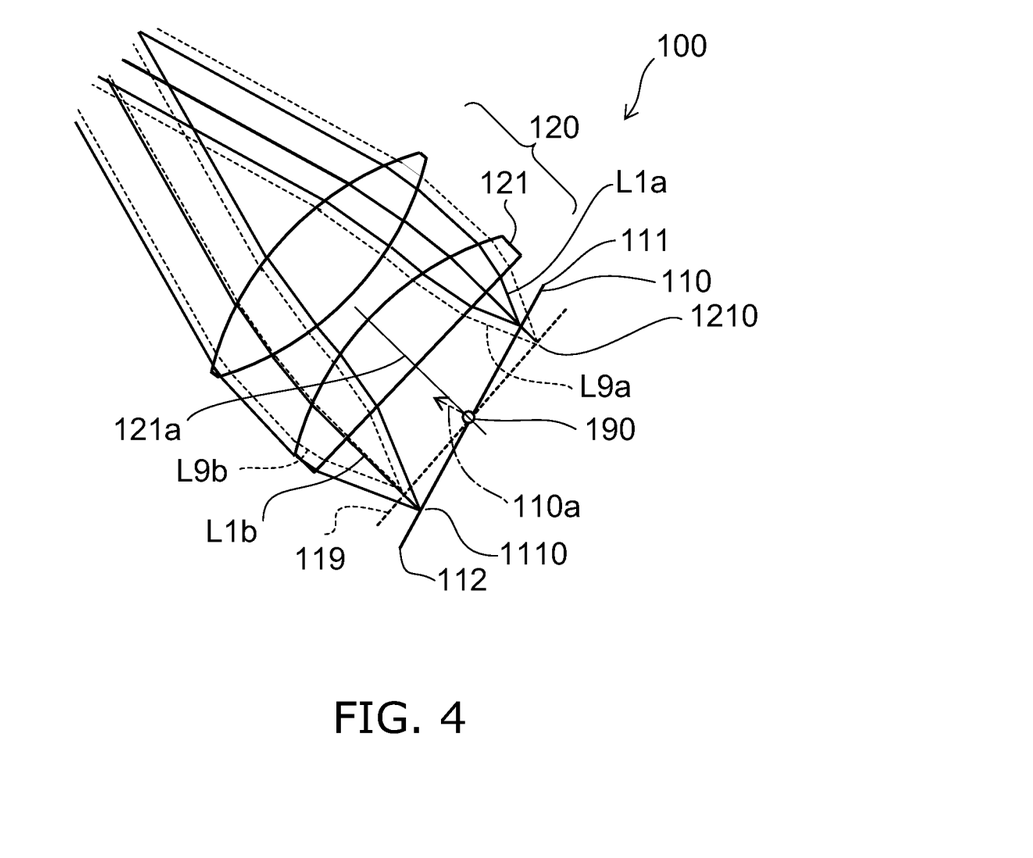
FIG. 4 is a schematic view illustrating the display device according to the first embodiment.

FIG. 4 is a schematic view illustrating the display device according to the first embodiment.

FIG. 4 shows the display unit 110, the optical unit 120, and optical paths of the light emitted from the pixels of the display unit 110. For reference, a display unit 119 that is not rotated with respect to the optical unit 120 and optical paths of the light emitted from the display unit 119 are shown.

The optical axis 121a of the first optical element 121 is not parallel to the normal 110a of the display unit 110 but intersects the normal 110a of the display unit 110. On the other hand, a normal 119a of the display unit 119 of the reference example is parallel to the optical axis 121a. Other than the disposition with respect to the optical unit 120, the display unit 119 is the same as the display unit 110.

The multiple pixels of the display unit 110 include a pixel 1210 (a first pixel) and a pixel 1110 (a second pixel). The pixel 1210 is provided between the first end portion 111 and the second end portion 112. The pixel 1110 is provided between the pixel 1210 and the second end portion 112.

The distance between the pixel 1210 and the first end portion 111 is shorter than the distance between the pixel 1210 and the second end portion 112.

The distance between the pixel 1110 and the first end portion 111 is longer than the distance between the pixel 1110 and the second end portion 112.

Light L1a that is emitted from the pixel 1210 is illustrated by solid lines. Light L1b that is emitted from the pixel 1110 provided at the second end portion 112 is illustrated by solid lines.

Light L9a and light L9b that are emitted from the pixels of the display unit 119 are illustrated by broken lines. The pixel of the display unit 119 that emits the light L9a corresponds to the pixel of the display unit 110 that emits the light L1a. Similarly, the pixel of the display unit 119 that emits the light L9b corresponds to the pixel of the display unit 110 that emits the light L1b.

For example, the spread angle of the bundle of rays emitted from each pixel is substantially the same between the pixels of the display unit 110 and the display unit 119. For example, the diameter of the bundle of rays of the light L9a and the diameter of the bundle of rays of the light L9b are substantially the same when the light is incident on the optical unit 120. Conversely, for the display unit 110, the diameter of the bundle of rays of the light L1b is larger than the diameter of the bundle of rays of the light L1a when the light is incident on the optical unit 120.

Thus, the pixel 1210 of the display unit 110 is caused to approach the optical element of the optical unit 120 by rotating the display unit 110. Thereby, for example, the bundle of rays can be set to be fine while the spread angle of the bundle of rays incident on the optical unit 120 from the display unit 110 remains fixed. On the other hand, the pixel 1110 of the display unit 110 becomes distal to the optical element of the optical unit 120. Thereby, for example, the bundle of rays that is incident on the optical unit 120 from the display unit 110 can be set to be wide.

Figure 5:
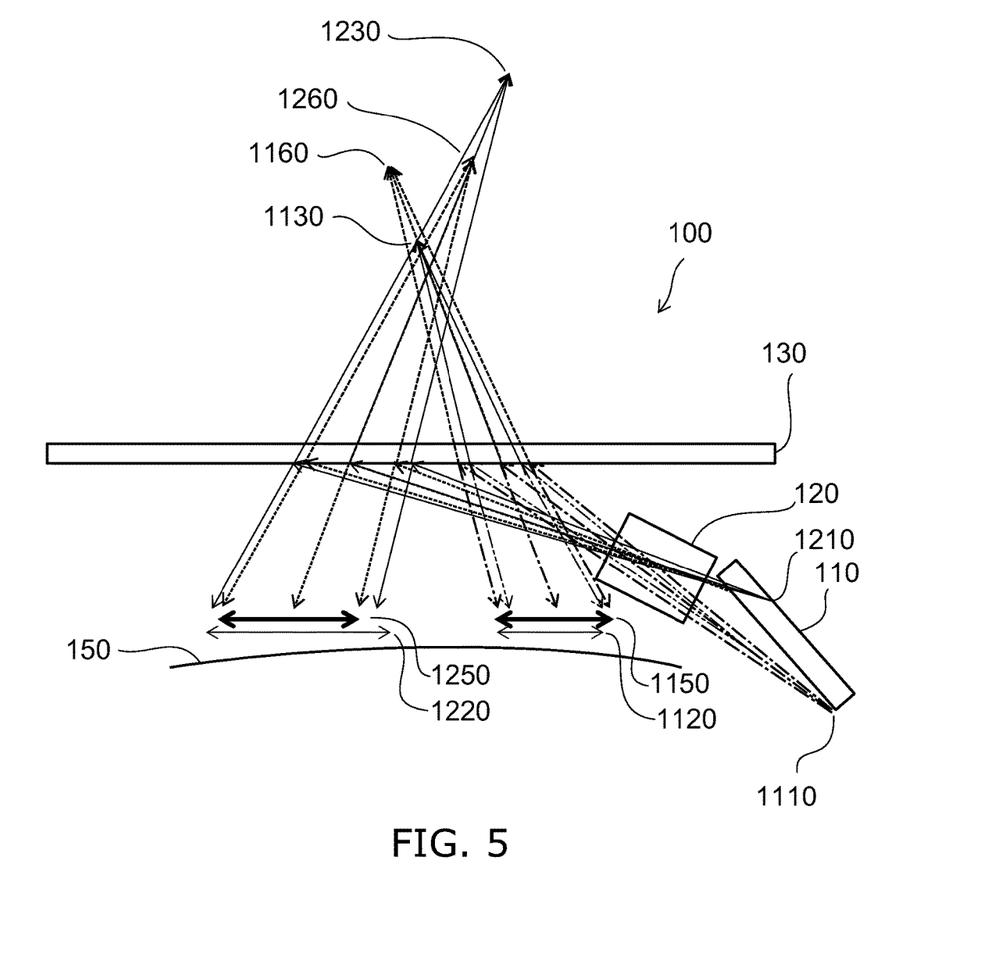
FIG. 5 is a schematic view illustrating the display device.

FIG. 5 is a schematic view illustrating the display device.

FIG. 5 shows optical paths of the light emitted from the display unit 110 and optical paths of the light emitted from the display unit 119 of the reference example.

The light L9a of the display unit 119 described in regard to FIG. 4 travels via the optical unit 120 and the reflector 130, is projected toward a region 1120 on the pupil 150 of the viewer 80, and forms an image at an imaging position 1130. On the other hand, the light L9b of the display unit 119 travels via the optical unit 120 and the reflector 130, is projected toward a region 1220 on the pupil 150, and forms an image at an imaging position 1230.

The spread angles of the bundle of rays emitted from the multiple pixels are substantially equal to each other. However, the optical path length to the reflector 130 is different between the positions where the pixels are provided. For example, the optical path length of the light L9a to the reflector 130 is longer than the optical path length of the light L9b to the reflector 130. Therefore, in the display unit 119 of the reference example, the region where the bundle of rays corresponding to the pixel 1210 is projected onto the reflector 130 is wider than the region where the bundle of rays corresponding to the pixel 1110 is projected onto the reflector 130. Accordingly, the region 1220 is wider than the region 1120.

The spread angle of the bundle of rays is maintained for the bundle of rays projected onto the region 1120 and the region 1220. Therefore, the imaging position 1230 where the bundle of rays projected onto the region 1220 having the wide surface area forms the image is more distal than the imaging position 1130 where the bundle of rays projected onto the region 1120 having the narrow surface area forms an image as viewed by the viewer 80. As a result, aberrations of mainly tilt occur in the image formed in the region including the imaging position 1230 and the imaging position 1130.

Conversely, in the display device 100 according to the embodiment, compared to the case of the display unit 119 of the reference example, the bundle of rays that is incident on the optical unit 120 from the pixel 1210 of the display unit 110 is fine. The bundle of rays that is emitted from the pixel 1210 travels via the reflector 130, is projected onto a region 1250 on the pupil 150, and forms an image at an imaging position 1260. The region 1250 is narrower than the region 1220. For example, the spread angle of the bundle of rays is substantially maintained for the bundle of rays emitted from each pixel. Thereby, compared to the imaging position 1230, the imaging position 1260 is proximal to the pupil 150.

On the other hand, compared to the case of the display unit 119 of the reference example, the bundle of rays that is incident on the optical unit 120 from the pixel 1110 of the display unit 110 is wide. The bundle of rays that is emitted from the pixel 1110 travels via the reflector 130, is projected onto a region 1150 on the pupil 150, and forms an image at an imaging position 1160. The region 1150 is wider than the region 1120. The spread angle of the bundle of rays is substantially maintained for the bundle of rays emitted from each pixel. Thereby, compared to the imaging position 1130, the imaging position 1160 is distal to the pupil 150.

Thus, the imaging positions of the bundle of rays emitted from the pixels can be adjusted by the disposition of the display unit 110 with respect to the optical unit 120. For example, the distance between the pupil 150 and the imaging position of the bundle of rays emitted from each pixel can be set to be substantially the same between the pixels. Thereby, when viewed from the pupil 150, an image in which the aberration is suppressed can be formed. An easily-viewable display can be obtained.

For example, a method that includes contrivances for the tilt and/or configuration of the reflective surfaces of the reflector may be considered to suppress the aberration. However, it is difficult to manufacture a special reflector with high precision. Conversely, in the embodiment, the aberration can be suppressed by the disposition of the display unit. Thereby, for example, the design and manufacture of the display device are easy.

Second Embodiment

Figure 6:
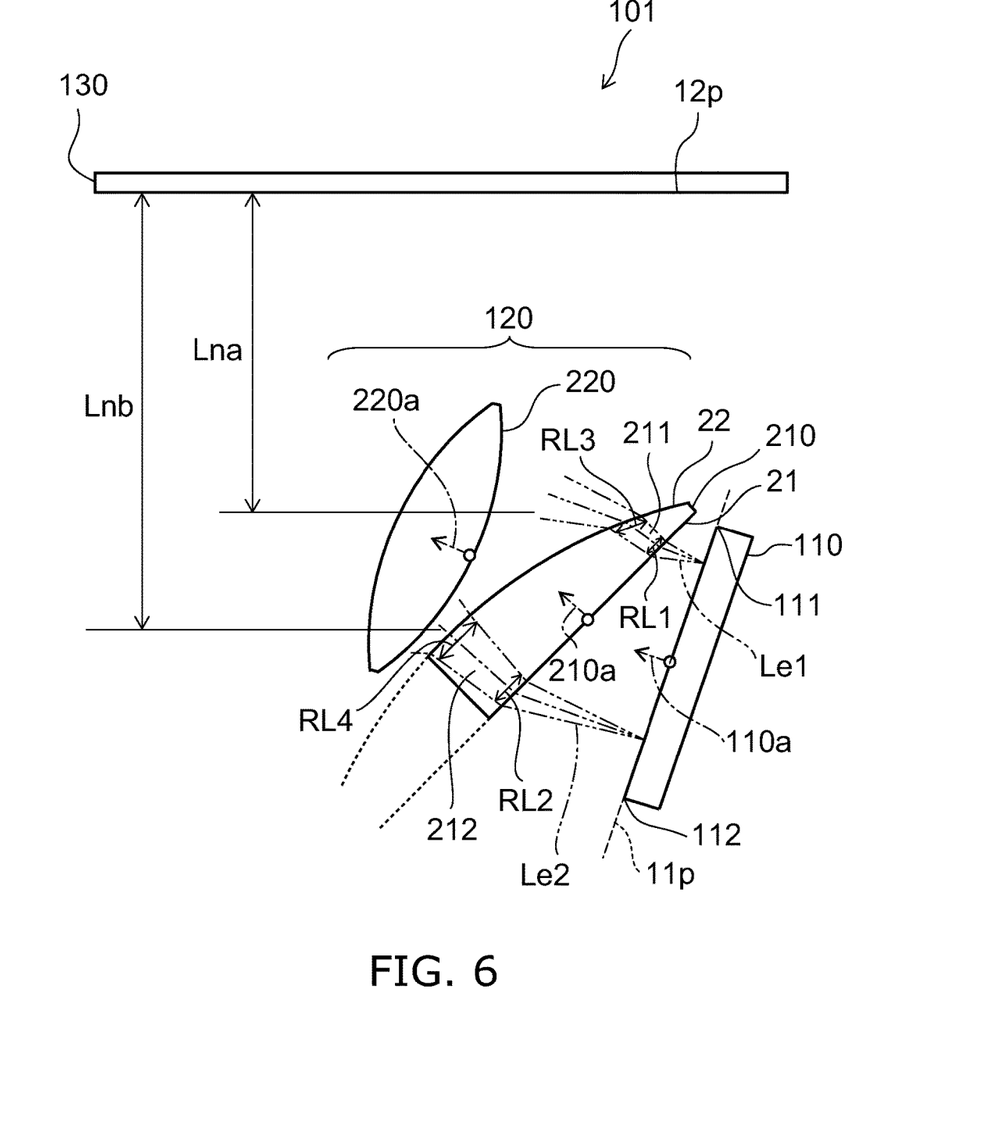
FIG. 6 is a schematic view illustrating a display device according to a second embodiment.

FIG. 6 is a schematic view illustrating a display device according to a second embodiment.

The display unit 110, the optical unit 120, and the reflector 130 are provided in the display device 101 as well. The optical unit 120 of the display device 101 includes a first optical element 210 and a second optical element 220. The first optical element 210 is provided between the second optical element 220 and the display unit 110 in the optical path of the light emitted from the pixels of the display unit 110. In the example, a lens is used as the second optical element 220; and the second optical element 220 modifies the travel direction of the light emitted from the display unit 110.

As shown in FIG. 6, a direction parallel to the normal 110a of the first plane 11p intersects a direction parallel to an optical axis 210a of the first optical element 210. Thereby, as described above, the aberration can be suppressed.

For example, a decentered lens is used as the first optical element 210. The first optical element 210 includes a first portion 211 and a second portion 212. For example, the distance between the first portion 211 and the reflector 130 is shorter than the distance between the second portion 212 and the reflector 130.

In the example, a distance Lna between the first portion 211 and the second plane 12p is shorter than a distance Lnb between the second portion 212 and the second portion 212.

The multiple pixels 110e include the first pixel (the pixel 1210) and the second pixel (the pixel 1110). The first pixel emits a first pixel light Le1. The second pixel emits a second pixel light Le2.

The first optical element 210 has an incident surface 21 on which the first pixel light Le1 and the second pixel light Le2 are incident and an emission surface 22 that emits the first pixel light Le1 and the second pixel light Le2 that are incident.

The first pixel light Le1 is incident on the first optical element 210 from the incident surface 21, passes through the first portion 211, and is emitted from the emission surface 22.

The second pixel light Le2 is incident on the second optical element 220 from the incident surface 21, passes through the second portion 212, and is emitted from the emission surface 22.

The diameter of the bundle of rays of the first pixel light Le1 at the incident surface 21 is a first value RL1. The diameter of the bundle of rays of the second pixel light Le2 at the incident surface 21 is a second value RL2.

The diameter of the bundle of rays of the first pixel light Le1 at the emission surface 22 is a third value RL3. The diameter of the bundle of rays of a fourth pixel light Le4 at the emission surface 22 is a fourth value RL4.

The third value RL3 is different from the first value RL1. The fourth value RL4 is different from the second value RL2 and different from the third value RL3.

The ratio of the third value RL3 to the first value RL1 is lower than the ratio of the fourth value RL4 to the second value RL2.

In the example shown in FIG. 6, the thickness of the second portion 212 is thinner than the thickness of the first portion 211. The optical path length of the first pixel light Le1 inside the first optical element 210 is shorter than the optical path length of the second pixel light Le2 inside the first optical element 210.

By using such a first optical element 210, the diameter of the bundle of rays of the light emitted from the pixel of the second end portion 112 of the display unit 110 is relatively larger than the diameter of the bundle of rays of the light emitted from the pixel of the first end portion 111. Therefore, the region where the light emitted from the pixel of the second end portion 112 is projected onto the pupil 150 is relatively wide. The region where the light emitted from the pixel of the first end portion 111 is projected onto the pupil 150 is relatively narrow. Thereby, for example, similarly to the description of FIG. 5, an image in which the aberration is suppressed can be formed.

Thus, the display unit 110 is disposed to be tilted with respect to the optical unit 120; and the first optical element of the optical unit 120 is a decentered lens. Thereby, the aberration can be suppressed further.

Although an element in which the thickness of the first portion 211 is different from the thickness of the second portion 212 is used as the first optical element, an element in which the refractive index of the first portion 211 is different from the refractive index of the second portion 212 may be used.

The optical paths of the light emitted from the pixels of the display unit 110 are tilted by traveling via the first optical element 210 (the decentered lens). As a result, the optical paths of the light incident on the reflector 130 also are tilted; the optical paths of the light that is reflected also are tilted; and there are cases where the light undesirably does not reach the pupil 150.

Conversely, in the display device 101 according to the embodiment, the second optical element 220 is disposed to be tilted with respect to the first optical element 210. In other words, a direction that is parallel to an optical axis 220a of the second optical element 220 intersects a direction that is parallel to the optical axis 210a of the first optical element 210 when projected onto a plane. In other words, the optical axis 220a is tilted with respect to the optical axis 210a. Thereby, the optical path that is tilted by the first optical element 210 (the decentered lens) can be corrected.

Figure 7:
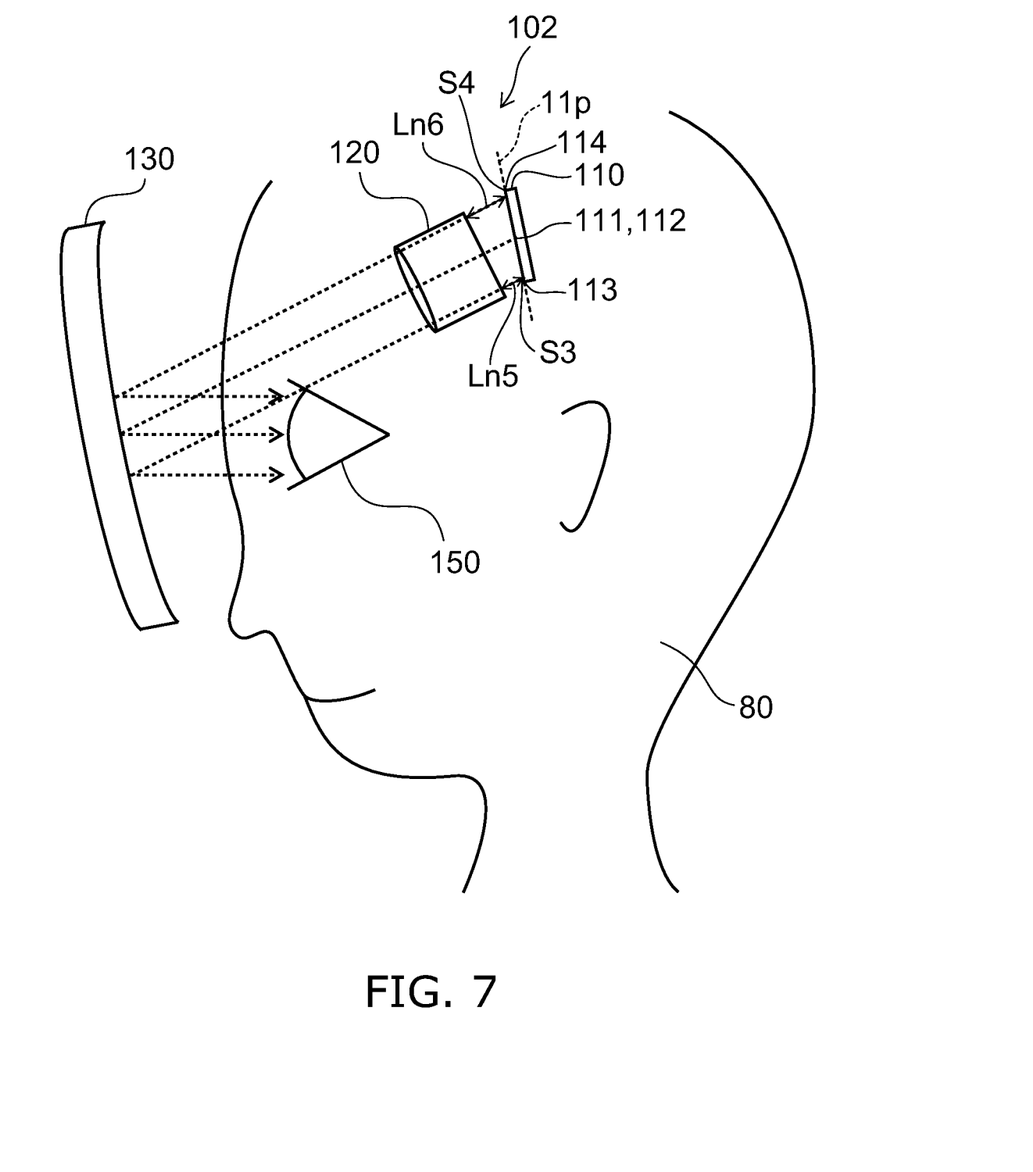
FIG. 7 is a schematic view illustrating another display device according to the second embodiment.

FIG. 7 is a schematic view illustrating another display device 102 according to the second embodiment.

In the display device 102, the normal of the reflector 130 is tilted with respect to the pupil 150; and the display unit 110 is disposed in the state of being rotated around an axis different from the rotational axis 190 shown in FIG. 2.

For example, the display unit 110 further has a third end portion 113 and a fourth end portion 114 on the first plane 11p. The display unit 110 has two sides (a side S3 and a side S4) opposing each other on the first plane 11p. The side S3 and the side S4 are different from the side S1 and the side S2 described above. The third end portion 113 is a point on the side S3; and the fourth end portion 114 is a point on the side S4.

The direction that connects the first end portion 111 and the second end portion 112 is orthogonal to the direction that connects the third end portion and the fourth end portion 114. A distance Ln5 between the third end portion 113 and the first optical element 121 is shorter than a distance Ln6 between the fourth end portion 114 and the first optical element 121.

The optical unit 120 and the display unit 110 are arranged to match the disposition of the reflector 130. For example, the optical unit 120 and the display unit 110 are tilted to match the tilt of the reflector 130. Thereby, for example, the light that is emitted from the pixels of the display unit 110 can be projected onto the pupil 150.

There are cases where tilting of the image viewed by the viewer 80 undesirably occurs due to the disposition (the tilt) of the optical unit 120. The display unit 110 is tilted with respect to the optical unit 120. Thereby, the tilt of the image can be suppressed.

FIG. 8 is a schematic perspective view illustrating another display device according to the second embodiment.

In the display device 103, the optical unit 120 further includes a cylindrical lens 510. The first optical element 121 is provided between the cylindrical lens 510 and the display unit 110 in the optical path of light L2 emitted from the pixels of the display unit 110.

For example, there are cases where an astigmatic aberration occurring in the image cannot be corrected sufficiently by only the disposition of the display unit 110. Conversely, by adding the cylindrical lens 510, the astigmatic aberration occurring in the image can be suppressed.

Figure 9:
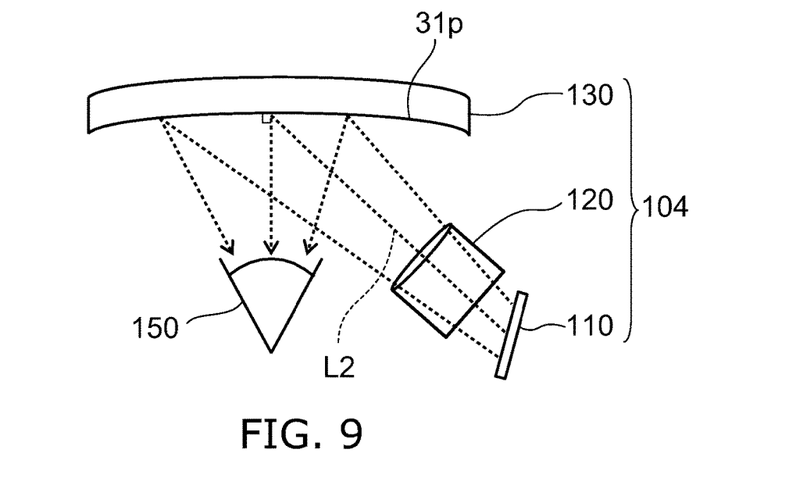
FIG. 9 is a schematic view illustrating another display device according to the second embodiment.

FIG. 9 is a schematic view illustrating another display device according to the second embodiment.

In the reflector 130 of the display device 104 shown in FIG. 9, the reflective surface that reflects the light L2 emitted from the pixels of the display unit 110 has a refractive power. Thereby, for example, the width of the region where the light L2 is projected onto the pupil 150 is adjusted; and the imaging position can be adjusted. It is easy to suppress the aberration by using the reflector 130 having the reflective surface that has a refractive power. For example, it is unnecessary to suppress the aberration using only the optical unit 120 and the display unit 110; and the design of the optical unit 120 and the display unit 110 is easier.

The configuration of the first surface 31p is a concave configuration as viewed from the position of the optical unit 120. Thereby, the reflector 130 that is provided at the first surface 31p can have a refractive power.

In the embodiment, the first surface 31p may be a plane. In such a case, the reflector 130 includes multiple reflective surfaces; and the tilt with respect to the optical unit 120 of each of the multiple reflective surfaces is adjusted. Thereby, the reflector 130 can have a refractive power.

Figure 10:
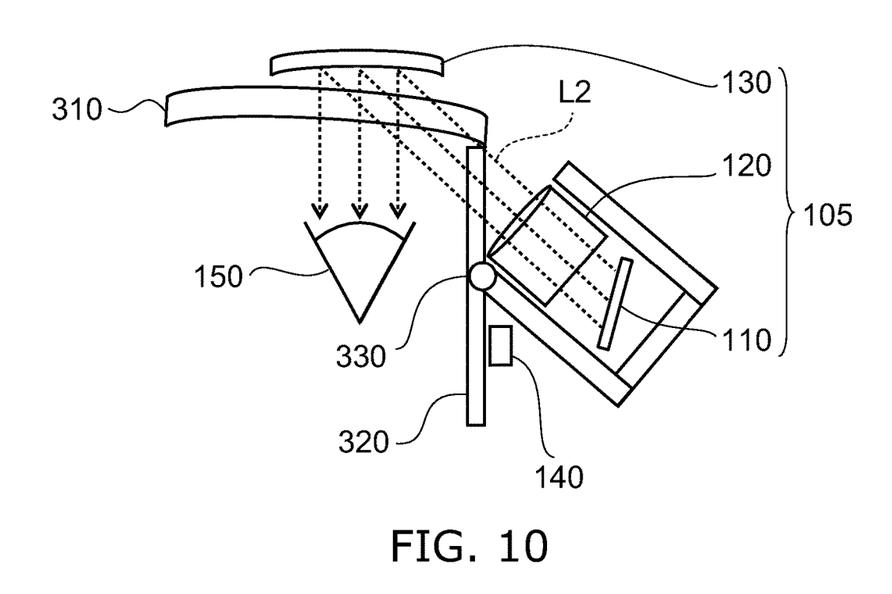
FIG. 10 is a schematic view illustrating another display device according to the second embodiment.

FIG. 10 is a schematic view illustrating another display device according to the second embodiment.

The display unit 110, the optical unit 120, and the reflector 130 are provided in the display device 105 as well. The display device 105 further includes a holder 320 and an eyeglasses lens 310.

The holder 320 holds at least one of the display unit 110, the optical unit 120, or the reflector 130. For example, the holder 320 regulates the relative arrangement of the reflector 130 and the optical unit 120 and the relative arrangement of the optical unit 120 and the display unit 110. The holder 320 is, for example, an eyeglasses frame. The display device 105 is mountable to the head of the viewer 80 by the holder 320.

In the example, the display unit 110, the optical unit 120, and the reflector 130 are disposed on the outer side of the eyeglasses. When viewed by the viewer 80, the reflector 130 is disposed to be more distal than the eyeglasses lens 310. In other words, at least a portion of the light emitted from the pixels of the display unit 110 is incident on the eyeglasses lens 310 after being reflected by the reflector 130.

The optical unit 120 and the display unit 110 are disposed on the outer side of the eyeglasses frame using a connector 330. Thereby, the display device 105 can be used while the viewer 80 wears the eyeglasses.

Figure 11:
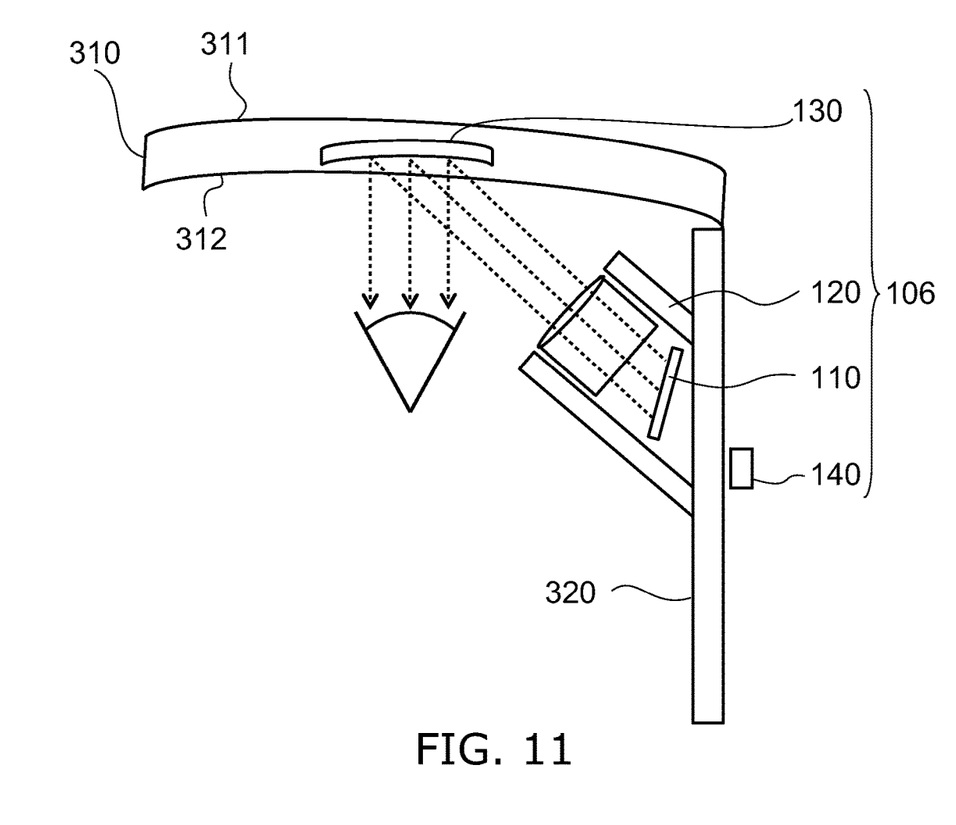
FIG. 11 is a schematic view illustrating another display device according to the second embodiment.

FIG. 11 is a schematic view illustrating another display device according to the second embodiment.

In the display device 106, the display device and the eyeglasses are provided as a single body.

The reflector 130 is disposed in the interior of the eyeglasses lens 310. For example, the eyeglasses lens 310 has a first lens surface 311, and a second lens surface 312 on the side opposite to the first lens surface. The reflector 130 is provided between the first lens surface 311 and the second lens surface 312.

The optical unit 120 and the display unit 110 are bonded to the holder 320. Thereby, the display device 106 can be use while the eyeglasses are worn. Further, the display device may be smaller.

It is favorable for the projection unit (the optical unit 120 and the display unit 110) to be provided so that the projection unit is disposed on the inner side of the frame when the viewer 80 wears the display device. In other words, it is favorable for the projection unit to be disposed between the viewer 80 and the holder 320 when the display device 106 is used (worn). Thereby, the viewer can use the display device as normal eyeglasses; and discomfort can be reduced when using the display device.

Figure 12:
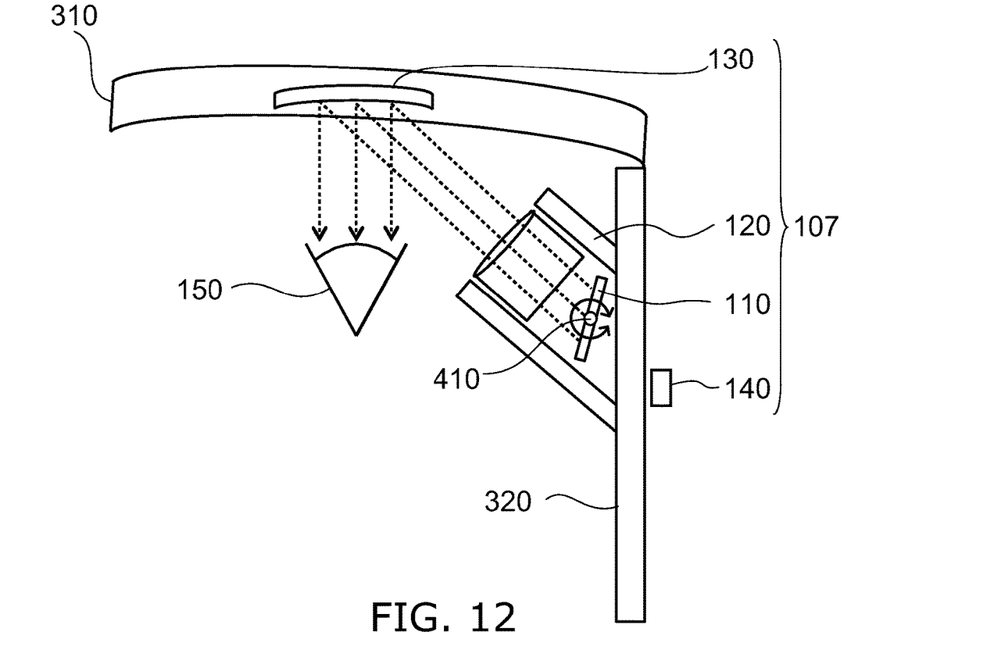
FIG. 12 is a schematic view illustrating another display device according to the second embodiment.

FIG. 12 is a schematic view illustrating another display device according to the second embodiment.

As shown in FIG. 12, the holder 320 of the display device 107 includes an adjustment unit 410 (a rotation unit). The adjustment unit 410 adjusts the relative arrangement of the optical unit 120 and the display unit 110. For example, the display unit 110 can be rotated around the adjustment unit 410.

Thereby, for example, when the disposition of the eyeglasses lens 310 with respect to the optical unit 120 changes, the viewer 80 can adjust the position of the display unit 110 to suppress the aberration by using the adjustment unit 410. The viewer 80 can obtained an easily-viewable image.

Figure 13:
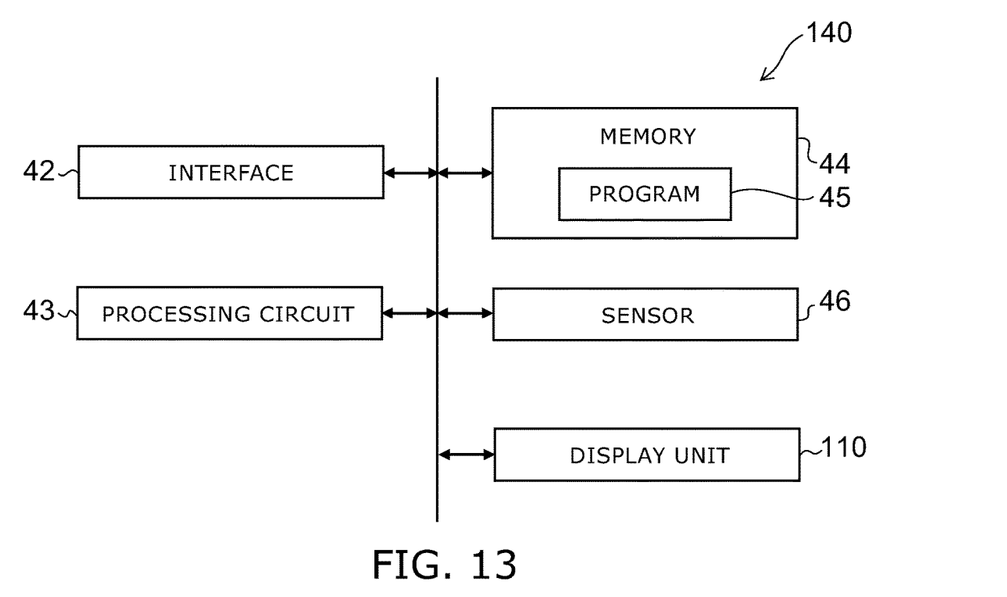
FIG. 13 is a schematic view illustrating the display device according to the embodiment.

FIG. 13 is a schematic view illustrating the display device according to the embodiment.

FIG. 13 shows an example of the system configuration of the display device according to the embodiment. The example shown in FIG. 13 is an example of the display device according to the embodiment and does not necessarily match the actual module.

As shown in FIG. 13, the processing unit 140 includes, for example, an interface 42, a processing circuit (a processor) 43, and memory 44.

For example, the processing unit 140 acquires the image information by being connected to an external storage medium and/or a network via the interface 42. A wired or wireless method may be used for the external connection.

For example, a program 45 that processes the acquired image information is stored in the memory 44. For example, the image information is appropriately converted based on the program 45; and thereby, an appropriate display is performed by the display unit 110. The image information may be stored in the memory 44. The program 45 may be provided in the state of being pre-stored in the memory 44, may be provided via a network and/or a storage medium such as CD-ROM, etc., or may be appropriately installed.

The processing unit 140 may include a sensor 46. The sensor 46 may include, for example, any sensor such as a camera, a microphone, a positional sensor, an acceleration sensor, etc. For example, the image that is displayed by the display unit 110 is modified appropriately based on the information obtained from the sensor 46. Thereby, the convenience and ease of viewing of the display device can be improved.

For example, the image information, the information obtained from the sensor 46, etc., are processed based on the program 45 by the processing circuit 43.

Thus, the obtained image information is input to the display unit 110 from the processing unit 140; and the display is performed by the display device.

A portion of each block or each entire block of the processing unit 140 may include an integrated circuit such as LSI (Large Scale Integration), etc., or an IC (Integrated Circuit) chipset. Each block may include an individual circuit; or a circuit in which some or all of the blocks are integrated may be used. The blocks may be provided as a single body; or some blocks may be provided separately. Also, for each block, a portion of the block may be provided separately. The integration is not limited to LSI; and a dedicated circuit or a general-purpose processor may be used.

According to the embodiments, an easily-viewable display device can be provided.

In the specification of the application, "perpendicular" and "parallel" include not only strictly perpendicular and strictly parallel but also, for example, the fluctuation due to manufacturing processes, etc.; and it is sufficient to be substantially perpendicular and substantially parallel.

Hereinabove, embodiments of the invention are described with reference to specific examples. However, the embodiments of the invention are not limited to these specific examples. For example, one skilled in the art may similarly practice the invention by appropriately selecting specific configurations of components such as the display unit, the optical unit, the reflector, the optical element, the holder, etc., from known art; and such practice is within the scope of the invention to the extent that similar effects can be obtained.

Further, any two or more components of the specific examples may be combined within the extent of technical feasibility and are included in the scope of the invention to the extent that the purport of the invention is included.

Moreover, all display devices practicable by an appropriate design modification by one skilled in the art based on the display devices described above as embodiments of the invention also are within the scope of the invention to the extent that the spirit of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A display device, comprising:
    a display unit to emit light including image information, the display unit including a plurality of pixels arranged in a first plane;
    an optical unit, at least a portion of the light emitted by the display unit being incident on the optical unit, the optical unit including a first optical element, a travel direction of the at least the portion of the light being modified by the first optical element;
    a reflector to reflect the at least a portion of the light modified by the first optical element,
    a first direction perpendicular to the first plane being non-parallel to an optical axis of the first optical element;
    the reflector having a first surface and spreading along the first surface,
    a first angle between the optical axis and a second plane, the first angle being larger than a second angle between the second plane and the first direction, the second plane being tangent to the first surface and passing through an intersection of the optical axis and the first surface,
    wherein the second plane is parallel to a second direction perpendicular to a third plane including the optical axis and the first direction, a portion of the light emitted by the display unit reflected by the reflector toward a pupil of a viewer is separated from the third plane.

2. The device according to claim 1, wherein
    the display unit includes a first end portion and a second end portion on the first plane,
    a distance between the reflector and the first end portion is shorter than a distance between the reflector and the second end portion, and
    a distance between the first end portion and the first optical element is shorter than a distance between the second end portion and the first optical element.

3. The device according to claim 2, wherein
    the display unit further includes a third end portion and a fourth end portion on the first plane,
    a direction connecting the first end portion to the second end portion is perpendicular to a direction connecting the third end portion to the fourth end portion, and
    a distance between the third end portion and the first optical element is shorter than a distance between the fourth end portion and the first optical element.

4. The device according to claim 2, wherein
    the pixels includes a first pixel to emit a first pixel light and a second pixel to emit a second pixel light, the first pixel being provided at the first end portion, the second pixel being provided at the second end portion,
    the first optical element has an incident surface and an emission surface, the first pixel light and the second pixel light being incident on the incident surface, the first pixel light and the second pixel light being emitted from the emission surface,
    a diameter of a bundle of rays of the first pixel light at the incident surface is a first value,
    a diameter of a bundle of rays of the second pixel light at the incident surface is a second value,
    a diameter of the bundle of rays of the first pixel light at the emission surface is a third value different from the first value,
    a diameter of the bundle of rays of the second pixel light at the emission surface is a fourth value different from the second value, and
    a ratio of the third value to the first value is lower than a ratio of the fourth value to the second value.

5. The device according to claim 4, wherein
    the optical unit further includes a second optical element to modify the travel direction of the light,
    the first optical element is provided between the second optical element and the display unit in an optical path of the light, and
    an optical axis of the second optical element is tilted with respect to an optical axis of the first optical element.

6. The device according to claim 2, wherein
    the pixels includes a first pixel to emit a first pixel light and a second pixel to emit a second pixel light, the first pixel being provided at the first end portion, the second pixel being provided at the second end portion,
    the first pixel light and the second pixel light are incident on the first optical element, and
    an optical path length of the first pixel light inside the first optical element is shorter than an optical path length of the second pixel light inside the first optical element.

7. The device according to claim 1, wherein the at least the portion of the light reflected by the reflector forms a virtual image.

8. The device according to claim 1, further comprising a holder to hold at least one of the reflector, the optical unit, or the display unit and to regulate a relative arrangement of the reflector and the optical unit,
    wherein the device is mountable to a head of a viewer.

9. The device according to claim 8, further comprising an eyeglasses lens,
    wherein
    the holder further holds the eyeglasses lens,
    the at least the portion of the light reflected by the reflector is incident on the eyeglasses lens.

10. The device according to claim 8, further comprising an eyeglasses lens formed as a single body with the reflector,
    wherein the display unit and the optical unit are disposed between the head and the holder when mounted.

11. The device according to claim 10, wherein
the eyeglasses lens has a first lens surface, and a second lens surface on a side opposite to the first lens surface,
the holder further holds the eyeglasses lens, and
the reflector is provided between the first lens surface and the second lens surface.

12. The device according to claim 8, wherein the holder includes an adjustment unit to adjust a relative arrangement of the optical unit and the display unit.

13. The device according to claim 1, wherein
the optical unit includes a plurality of optical elements including the first optical element, and
the first optical element is one of the optical elements most proximal to the display unit.

14. The device according to claim 1, wherein an angle between the perpendicular direction and the optical axis is not less than 1 degree and not more than 10 degrees.

15. The device according to claim 1, wherein the reflector includes a plurality of reflective surfaces,
the reflective surfaces reflect the at least the portion of the light.

16. The device according to claim 1, wherein the first optical element is a decentered lens.

17. The device according to claim 1, wherein
the optical unit further includes a cylindrical lens, and
the first optical element is provided between the cylindrical lens and the display unit in an optical path of the light.

18. The device according to claim 1, wherein a reflective surface of the reflector reflecting the light has a refractive power.

19. The device according to claim 1, wherein the first surface is a plane.

20. The device according to claim 1, wherein the pupil of the viewer is separated from the third plane.

* * * * *